United States Patent
Adler et al.

(10) Patent No.: US 6,601,602 B2
(45) Date of Patent: Aug. 5, 2003

(54) PRESSURE-CONTROL VALVE

(75) Inventors: Bernhard Adler, Elchingen (DE); Horst Stegmaier, Ulm (DE)

(73) Assignee: Brueninghaus Hydromatik GmbH, Elchingen (DE)

( * ) Notice: Subject to any disclaimer, the term of this patent is extended or adjusted under 35 U.S.C. 154(b) by 87 days.

(21) Appl. No.: 09/837,789

(22) Filed: Apr. 18, 2001

(65) Prior Publication Data

US 2002/0011269 A1 Jan. 31, 2002

(30) Foreign Application Priority Data

Apr. 18, 2000 (DE) .......................... 100 19 254

(51) Int. Cl.$^7$ .................. F15B 11/042; F15B 11/044; G05D 16/14
(52) U.S. Cl. .............. 137/115.23; 137/114; 137/115.13
(58) Field of Search ................. 137/488, 489, 137/487.5, 491, 492.5, 596.16, 114, 115.13, 115.23

(56) References Cited

U.S. PATENT DOCUMENTS

| | | | | |
|---|---|---|---|---|
| 4,453,565 A | * | 6/1984 | Neff ............................ | 137/596 |
| 5,421,545 A | * | 6/1995 | Schexnayder ............ | 137/487.5 |
| 5,829,481 A | * | 11/1998 | Tajima et al. ............... | 137/884 |
| 5,988,214 A | * | 11/1999 | Tajima et al. ............... | 137/596 |
| 6,012,490 A | * | 1/2000 | Tajima et al. ............... | 137/596 |
| 6,170,520 B1 | * | 1/2001 | Narita et al. ........... | 137/596.16 |

FOREIGN PATENT DOCUMENTS

| | | |
|---|---|---|
| DE | 2 042 094 | 4/1971 |
| DE | 195 12 143 C1 | 7/1996 |

* cited by examiner

Primary Examiner—George L. Walton
(74) Attorney, Agent, or Firm—Scully, Scott, Murphy & Presser

(57) ABSTRACT

A pressure-control valve (1) comprises a first control piston (1), which is disposed between a first pressure chamber (6), which adjoins the first control piston (1) and is connected to at least one working line (A, B), and a second pressure chamber (7), which adjoins the first control piston (1) and is pushed against a stop (3) by a first preloading spring (4). A throttle (8) connects the first pressure chamber (6) and the second pressure chamber (7). The second pressure chamber (7) is connected to a second control piston (11), which is preloaded by a second preloading spring (17) and which, when a predetermined pressure in the second pressure chamber (7) is exceeded, is displaced to an extent such that a control edge (12) of the second control piston (11) clears a connection of the second pressure chamber (7) to a hydraulic fluid discharge point (23). The first control piston (1) comprises a control edge (2) which connects an actuating pressure line (5) to a hydraulic fluid discharge point (23) when the first control piston (1) is displaced against the first preloading spring (4). An actuator (15), which is regulated by a control signal, presses onto the second control piston (11) against the second preloading spring (17).

9 Claims, 1 Drawing Sheet

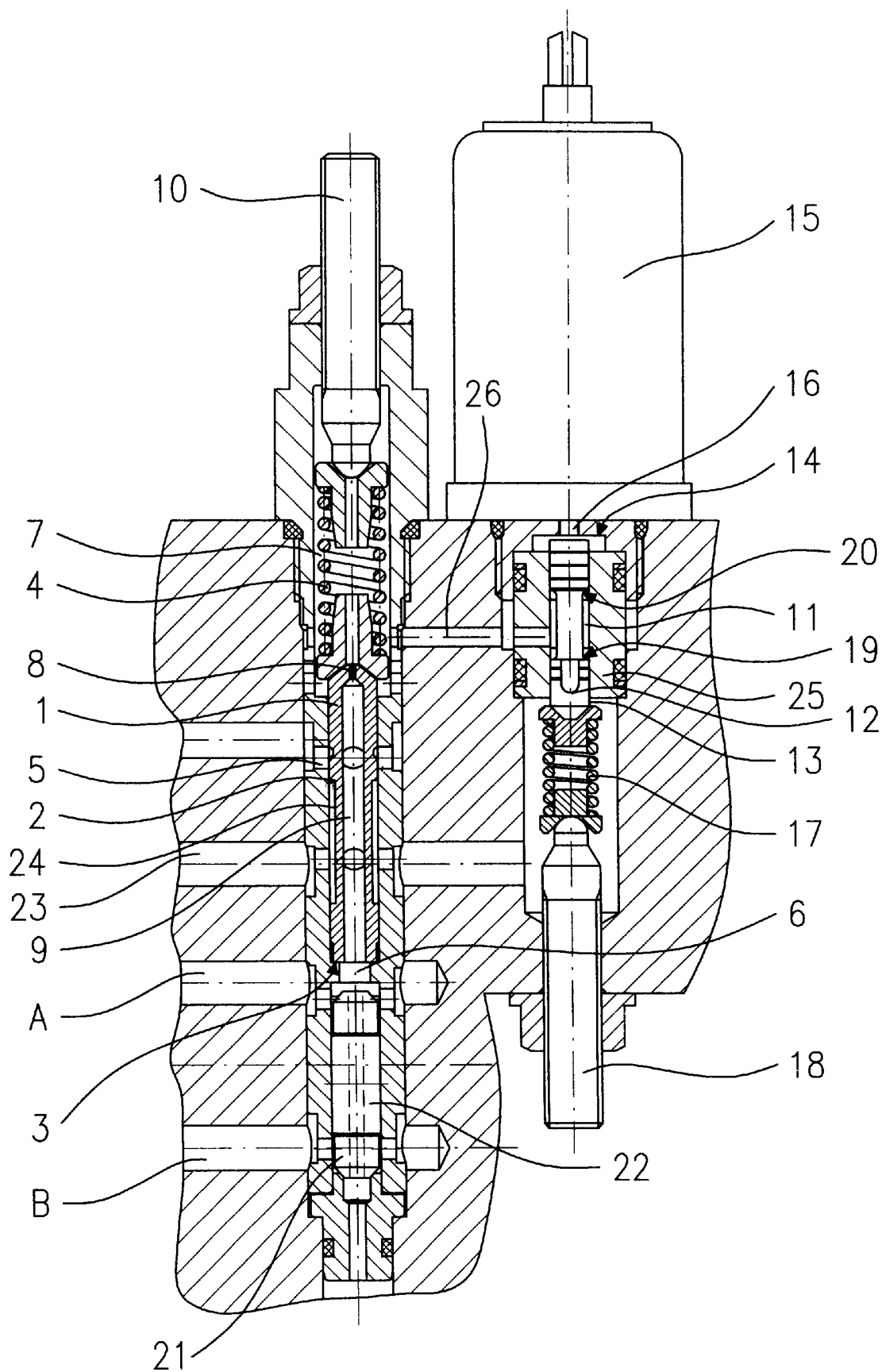

PRESSURE-CONTROL VALVE

The invention relates to a pressure-control valve according to the preamble of claim 1.

A pressure-control valve of this kind is known from DE 195 12 143 C1. In this valve the hydraulic fluid pressure which is to be regulated acts on a check piston in a working chamber. This check piston is pushed into a seat by a preloading spring. If the pressure exceeds a certain value, the check piston is raised from its seat and clears a hydraulic fluid discharge point to a discharge opening. The pressure is limited to a certain value through the discharge of a volumetric flow which does not have to overcome any dynamic resistance. However this method, which is most simple in terms of basic system, of regulating a pressure, i.e. allowing a quantity of hydraulic fluid which causes the excess pressure in a system to run off in a volumetric flow, since it cannot be taken up by appropriate consumers, has the disadvantage of resulting in a loss of capacity and possibly heat production in the overall system. It is therefore more favourable and desirable to limit a volumetric flow by regulating the volumetric delivery of hydraulic fluid instead of limiting the pressure in the hydraulic systems by letting this flow run off.

A construction of a pressure-relief valve which comprises a second pressure chamber and a second valve is known from DE-OS 20 42 094. This second valve, which is called a pilot valve, regulates the opening and closing of a first valve, which clears a cross section to discharge a volumetric flow of the hydraulic fluid. The first valve consists of a sleeve as valve piston, which is pushed against a seat by a first preloading spring. A throttle bore is located centrally in this valve sleeve, via which bore the pressure chamber whose pressure is to be measured and regulated is connected to a second pressure chamber. The second pressure chamber is connected to the second valve, which comprises a cone which is pressed against a seat by a second preloading spring. The pressure in the first and the second pressure chamber is equal as long as the second valve is closed. The valve sleeve of the first valve is pressed against its seat by the preloading spring. If the pressure which acts on the second valve in the second pressure chamber via the throttle now exceeds a preset value, the second valve will open. The hydraulic fluid can now run off and the pressure in the second pressure chamber drops significantly, as only a small quantity of hydraulic fluid can continue flowing via the throttle bore. Pressure therefore only acts on the valve piston of the first valve, the sleeve, from one side, namely the first pressure chamber. It lifts off its seat and clears the valve flow opening. The advantage of a valve construction of this kind with a pilot valve lies in the fact that the valve responds well. However the prior art described in this publication entails the disadvantage of also letting a volumetric flow run off to regulate the pressure. Moreover, the pressure at which the valve opens can only be regulated via a screw against which the second valve spring is supported. Neither adjustment during operation nor remote adjustment is possible.

The object of the invention is therefore to provide a pressure-control valve according to the preamble of claim 1 whose regulation pressure can be continuously and remotely adjusted and which regulates an actuating variable, so that the pressure in the system can be regulated by this actuating variable, for example the actuating pressure of a hydraulic pump.

This object is achieved according to claim 1 by a pressure-control valve with a first control piston, which is disposed between a first pressure chamber, which adjoins the first control piston and is connected to at least one working line, and a second pressure chamber, which adjoins the first control piston. This first control piston is pushed against a first seat by a first preloading spring, a throttle connecting the first and the second pressure chamber. The second pressure chamber is connected to a second control piston, which is preloaded by a second preloading spring and which, when a predetermined pressure in the second pressure chamber is exceeded, is displaced to an extent such that a control edge of the second control piston clears a discharge point of the second pressure chamber. Here the first control piston comprises a control edge which connects an actuating pressure line to a hydraulic fluid discharge point when the control piston is displaced against the first preloading spring. An actuator, which is regulated by a control signal, presses onto the second control piston against the second preloading spring.

A pressure-control valve according to the invention can be remotely regulated in a favourable manner, as the actuator can be regulated via a control signal and the regulation pressure determined via this actuator. Advantageous developments and configurations of the invention are indicated in the subclaims.

The pressure-control valve advantageously only regulates one actuating pressure line, via which the capacity of a feed pump which builds up and maintains the hydraulic pressure is regulated downwards. Thus the pressure is regulated in the system not just through the discharge of a volumetric flow which simply flows back from the feed pump into the hydraulic system via the pressure-regulating valve to a storage tank or the pump intake side while giving rise to a loss of capacity and therefore emitting heat.

The invention is explained in detail in the following on the basis of a preferred embodiment, while referring to the single figure of the drawings, this figure showing the cross section of a pressure-control valve according to the invention.

The first control piston 1 comprises a control edge 2. This clears an actuating pressure line 5 when the first control piston 1 is lifted off its stop 3 against the preloading pressure of a first preloading spring 4. A recess 24, which adjoins the control edge 2, of the first control piston 1 then enables the actuating pressure line 5 to be connected to a hydraulic fluid discharge point 23. The first control piston 1 separates a first pressure chamber 6 from a second pressure chamber 7. These are connected together via a throttle 8, which lies in a bore 9 in the first control piston 1 in the embodiment according to the invention which is represented here. Neither of the two pressure chambers 6, 7 are connected to the recess 24 in the first control piston 1. Also represented is a first threaded pin 10, on which the first preloading spring 4 is supported.

The second pressure chamber 7 is connected to a control piston 11, which in the embodiment represented here is constructed as a differential area piston and comprises a control edge 12. This control edge 12 co-operates with the edge 13 of the guide cylinder 25. The second control piston 11 is pushed by a second preloading spring 17 against a stop 14. An actuator 15, here in the form of an electromagnetic proportional magnet, which exerts a force proportional to the current flowing through it, presses via a connecting element 16 onto the second control piston 11 against the second preloading spring 17. The second preloading spring 17 is supported against a second threaded pin 18, by means of which the degree of compression and thus of preloading of the second preloading spring 17 can be determined.

The second control piston 11 is formed as a differential area piston in the embodiment according to the invention. The area 19 of the second control piston 11 on which the pressure from the second pressure chamber 7 acts via the connecting line 26 and which lies on the side of the second preloading spring 17 in the guide cylinder 25 of the second control piston 11, is greater than the area 20 which lies to the side of the actuator 15 and on which the pressure from the second pressure chamber 7 likewise acts. As the pressure in the second pressure chamber 7 increases, this results in a force on the differential area piston, or second control piston 11, which is directed against the second preloading spring 17. The force of the actuator 15, which also acts in the same direction on the second control piston 11 via the connecting element 16, is added to this force. In the construction according to the invention which is represented here the actuator 15 is a proportional electromagnet. Thus the force on the differential piston, the second control piston 11, can be increased as the current increases and the pressure in the second pressure chamber 7 which is required to move the second control piston 11 away from its stop against the second preloading spring 17 continuously regulated.

Also represented in the drawing is a shuttle valve piston 21 with an inner through-bore 22, which is only indicated by broken lines here. Pressure acts on the shuttle valve piston 21 from a working line A and a further working line B. According to which of the working lines A, B exhibits the higher pressure, the shuttle valve piston 21 is displaced into one of its two stop positions and in one instance clears the connection from the first working line A, if this exhibits the higher pressure, to the first pressure chamber 6 or, if the working line B exhibits the higher pressure, the connection between the second working line B and the first pressure chamber 6 via the bore 22. This provides the advantageous possibility of simultaneously regulating two working lines with one pressure-control valve such that the pump is regulated in accordance with the higher pressure in the two working lines A, B.

If the pressure in the first pressure chamber 6 now rises, hydraulic fluid will flow via the throttle 8 into the second pressure chamber 7 until the pressure there has adapted. If the pressure in the second pressure chamber 7 exceeds a preset value, the second control piston 11 will open a discharge point for the hydraulic fluid by way of its control edge 12. This opening pressure of the second control piston 11 is determined by the difference between the force of the second preloading spring 17 and the force of the actuator 15. Upon opening, the second control piston 11 clears a discharge point for the hydraulic fluid at its control edge 12 as soon as this control edge 12 sweeps over the edge 13 of the guide cylinder 25. As a result of the hydraulic fluid running off, and as only a limited quantity of hydraulic fluid can continue flowing through the throttle 8, the pressure in the second pressure chamber 7 drops and the first control piston 1 is lifted off its stop 3 against the pressure of the first preloading spring 4 by the pressure of the hydraulic fluid in the first pressure chamber 6. The control edge 2 of the first control piston 1 thereby sweeps over the opening of the actuating pressure line 5 and clears a discharge point 23 for the actuating pressure line 5. The actuating pressure in the actuating pressure line 5 drops and as a result the volumetric delivery of a hydraulic pump which is regulated via this actuating pressure line 5 is regulated downwards or the hydraulic pump reset.

If the actuator 15 exerts its maximum force on the second control piston 11, so that this second control piston 11 is always open, the minimum pressure which is to be regulated in the first pressure chamber 6 will be determined solely by the first preloading spring 4 and the throttle resistance of the throttle 8. This means that the minimum pressure which the pressure-control valve can regulate can be set at the threaded pin 10, by means of which the first preloading spring 4 is supported and by which it is compressed.

The maximum regulation pressure which can be regulated by the pressure-control valve can accordingly be set at the second threaded pin 18 when the actuator 15 exerts no force of any kind. The maximum preloading force is exerted on the second control piston 11 by compressing the second preloading spring 17. This pressure is transmitted via the second pressure chamber 7 and the throttle 8 and is the maximum possible regulation pressure in the first pressure chamber 6.

The invention combines the advantages of a valve having a pilot valve, such as rapid response and servo action, with the possibility of remote control via a control line. The regulating variable of the pressure control valve can therefore be varied during operation. A further advantage lies in the fact that, rather than the pressure being controlled through the discharge of a volumetric flow from the working line with the loss of capacity and, in particular, heat generation which this entails, the adjustment of the hydraulic pump is regulated. As a result of connecting the shuttle valve piston 21 upstream, the higher pressure of two working lines A and B can be taken as regulating variable.

What is claimed is:

1. Pressure-control valve with a first control piston (1), which is disposed between a first pressure chamber (6), which adjoins the first control piston (1) and is connected to at least one working line (A, B), and a second pressure chamber (7), which adjoins the first control piston (1) and is pr loaded against a stop (3) by a first preloading spring (4), and a throttle (8) connecting the first pressure chamber (6) and the second pressure chamber (7), wherein the second pressure chamber (7) is connected to a second control piston 11, which is preloaded by a second preloading spring (17) and which, when a predetermined pressure in the second pressure chamber (7) is exceeded, is displaced to an extent such that a control edge (12) of the second control piston (11) clears a connection of the second pressure chamber (7) to a hydraulic fluid discharge point (23), characterised in that the first control piston (1) comprises a control edge (2) which connects an actuating pressure line (5) to the hydraulic fluid discharge point (23) when the first control piston (1) is displaced against the first preloading spring (4), the throttle (8) being disposed in a bore (9) in the first control piston (1); and an actuator (15), which is activated by a control signal, act on the second control piston (11) against the second preloading spring (17), said second control piston (11) having a maximum force exerted thereon and said first control piston being lifted off from said stop (3) when no force is provided by said actuator (15) to thereby produce a maximum pressure in working lines (A, B).

2. Press re-control valve according to claim 1, characterised in that control edge (12) of the second control piston (11) clears a discharge point having a cross section greater than that of the throttle (8).

3. Pressure-control valve according to claim 1 or 2, characterised in that the second control piston (11) is a differential area piston comprising two differeing areas (19, 20) which act in oppiosoition to one another and on which the pressure from the second pressure chamber (7) acts.

4. Pressure-control valve according to claim 1, characterised in that the actuator (15) is a proportional magnet having an electric current flowing therough it as control signal.

5. Press re-control valve according to claim 1, characterised in that, adjoining the control edge (2), the first control piston (1) comprises at the outer circumference at least one recess (24) via which hydraulic fluid can run off out of the actuating pressure line (5) to the hydraulic fluid dishcarge point 23).

6. Pressure-control valve according to claim 5, characterised in that the recess (24) is not connected either to the first pressure chamber (6) or the second pressure chamber (7).

7. Pressre-cotnrol valve according to claim 1, characterised in that the first preloacding spring (4) is supported against a first threaded pin (10), and a minimum regulation pressure in the working me (A, B) can be set by the latter upon maximum activation of the actuator (15).

8. Pressure-control valve according to claim 1, characterised in that the second preloading spring (17) is supported against a second threaded pin (18), and the maximum regualtion pressure in the working line (A, B) can be set at the latter when the actuator (15) is inactive.

9. Pressure-control valve according to claim 1, characterised in that a shuttle valve piston (21) is disposed between the first pressure chamber (6) and two said working lines (A, B), which piston is slidably disposed said bore (9) in the first control piston (1) of the pressure-control valve and can be displaced between two end positions through the action of a respective higher pressure of a hydraulic fluid in one of the two working lines (A, B), wherein the shuttle valve piston (21) comprises an inner through-bore (22) which extends over its entire length and via which the higher pressure is admitted to the first pressure chamber (6) when the shuttle valve piston (21) is on one of two end positions thereof.

* * * * *